(12) United States Patent
Takahata et al.

(10) Patent No.: US 10,014,524 B2
(45) Date of Patent: Jul. 3, 2018

(54) NONAQUEOUS SECONDARY BATTERY

(75) Inventors: Koji Takahata, Toyota (JP); Machiko Abe, Toyota (JP); Akihiro Ochiai, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 209 days.

(21) Appl. No.: 14/350,949

(22) PCT Filed: Oct. 11, 2011

(86) PCT No.: PCT/JP2011/073353
§ 371 (c)(1),
(2), (4) Date: Apr. 10, 2014

(87) PCT Pub. No.: WO2013/054398
PCT Pub. Date: Apr. 18, 2013

(65) Prior Publication Data
US 2014/0272540 A1   Sep. 18, 2014

(51) Int. Cl.
| H01M 4/62 | (2006.01) |
| B60L 11/18 | (2006.01) |
| H01M 4/02 | (2006.01) |
| H01M 4/36 | (2006.01) |
| H01M 10/0525 | (2010.01) |
| H01M 10/34 | (2006.01) |

(52) U.S. Cl.
CPC .......... H01M 4/622 (2013.01); B60L 11/187 (2013.01); B60L 11/1862 (2013.01); B60L 11/1879 (2013.01); B60L 2240/545 (2013.01); B60L 2240/547 (2013.01); B60L 2240/549 (2013.01); H01M 4/02 (2013.01); H01M 4/362 (2013.01); H01M 10/0525 (2013.01); H01M 10/345 (2013.01); H01M 2220/20 (2013.01); Y02E 60/122 (2013.01); Y02E 60/124 (2013.01); Y02T 10/705 (2013.01); Y02T 10/7011 (2013.01); Y02T 10/7044 (2013.01)

(58) Field of Classification Search
None
See application file for complete search history.

(56) References Cited

U.S. PATENT DOCUMENTS

| 6,019,802 A | 2/2000 | Ishizuka et al. |
| 2011/0281161 A1* | 11/2011 | Ikeda ..................... H01M 4/13 |
| | | 429/211 |
| 2012/0177990 A1 | 7/2012 | Mitsuhashi et al. |
| 2012/0214063 A1* | 8/2012 | Morimoto ............. H01M 4/131 |
| | | 429/211 |
| 2013/0022867 A1 | 1/2013 | Suzuki |

FOREIGN PATENT DOCUMENTS

| DE | 11 2011 101 607 T5 | 4/2013 |
| JP | H10-270013 A | 10/1998 |
| JP | 3726163 B | 12/2005 |
| JP | 2007-12559 | 1/2007 |
| JP | 2007-234418 | 9/2007 |
| JP | 2008-84742 | 4/2008 |
| JP | 2010-182479 | 8/2010 |
| JP | 4761010 | 8/2011 |
| WO | WO 2010089898 | * 8/2010 |
| WO | WO 2011058981 | * 5/2011 |
| WO | WO 2011/109815 A1 | 9/2011 |

OTHER PUBLICATIONS

JP 2010182479—Translation.*

* cited by examiner

*Primary Examiner* — Ladan Mohaddes
(74) *Attorney, Agent, or Firm* — Finnegan, Henderson, Farabow, Garrett & Dunner, LLP

(57) ABSTRACT

A nonaqueous secondary battery 100A has a negative electrode sheet 240A in which a negative electrode active material layer 243A is held by a negative electrode current collector 241A. Contained within the negative electrode active material layer 243A is a binder 730 which includes a rubber-based binder or a resin having a binder function. The rubber-based binder or the resin having a binder function is abundantly present, within the negative electrode active material layer 243A, in a surface vicinity A1 of the negative electrode active material layer 243A.

9 Claims, 14 Drawing Sheets

NONAQUEOUS SECONDARY BATTERY

CROSS-REFERENCE TO RELATED APPLICATIONS

This application is a national phase application of International Application No. PCT/JP2011/073353, filed Oct. 11, 2011, the content of which is incorporated herein by reference.

TECHNICAL FIELD

The invention relates to a nonaqueous secondary battery.
In this Description, "secondary battery" refers to batteries which can be repeatedly charged in general, and encompasses so-called electrical storage devices, such as lithium secondary batteries (typically, lithium ion secondary batteries) and nickel-metal hydride batteries. Also, in this Description, "active material" refers to a substance which can reversibly intercalate and deintercalate (typically, insert and extract) the chemical species that becomes the charge carrier in a secondary battery (e.g., lithium ions in a lithium ion secondary battery). In addition, "nonaqueous secondary battery" refers to a secondary battery in which a nonaqueous electrolyte (e.g., a nonaqueous electrolyte solution) has been used as the electrolyte.

BACKGROUND ART

For example, Japanese Patent Application Publication No. 2008-84742 (JP 2008-84742 A) discloses providing a spider's web-like film of polyvinylidene fluoride (PVDF) on the surface of an electrode mixture layer. According to this publication, such a spider's web-like film of PVDF keeps electrode debris from forming and getting into the battery interior, enabling lithium ion secondary batteries having a low level of defectiveness and improved reliability to be obtained.

That is, according to the disclosure made in this publication, when there is no PVDF film formed on the surface of the electrode mixture layer, electrode powder adheres to the tacky side of tape that has been attached to the surface of the electrode mixture layer. However, when there is a PVDF film formed on the surface of the electrode mixture layer, electrode powder does not adhere to tape that has been attached to the electrode mixture layer surface. Hence, this publication discloses that the electrode does not readily fall off, suppressing the generation of electrode debris.

CITATION LIST

Patent Literature

Patent Literature 1: JP 2008-84742 A

SUMMARY OF INVENTION

Technical Problem

In nonaqueous secondary batteries such as lithium ion secondary batteries, use is made of a negative electrode in which a negative electrode active material layer containing negative electrode active material particles is held by a negative electrode current collector. Particularly in cases where the lithium ion secondary battery is used as the power source for a motor that drives the drive wheels of a vehicle (vehicle drive battery), discharge at a considerably high rate is required. In addition, high-rate charging is required in charging that utilizes energy regeneration during braking. In high-rate discharging, the negative electrode active material layer must deintercalate a large amount of lithium ions instantaneously. In high-rate charging, the negative electrode active material layer must be able to intercalate a large amount of lithium ions instantaneously.

Also, because vehicle drive batteries are left outdoors, depending on the climate and season in the region where a vehicle is to be used, it is desired that the required battery function be achieved in a wide range of temperature environments from high temperatures up to about 60° C. to low temperatures down to about −30° C. As noted above, when a vehicle drive battery is repeatedly charged and discharged at a high rate, a considerable amount of lithium ions are repeatedly deintercalated and intercalated within the negative electrode active material layer. However, in a low-temperature environment in particular, the reaction rate of lithium ion deintercalation and intercalation within this negative electrode active material layer decreases, which is a major factor limiting the battery reaction rate.

Solution to Problem

The nonaqueous secondary battery according to one embodiment of the invention has a negative electrode current collector, and a negative electrode active material layer held by the negative electrode current collector. The negative electrode active material layer includes negative electrode active material particles and a binder. The binder contains a rubber-based binder or a resin having a binder function. The rubber-based binder or the resin having a binder function is abundantly included in a surface vicinity of the negative electrode active material layer.

In this nonaqueous secondary battery, the surface vicinity of the negative electrode active material layer includes an abundant amount of rubber-based binder or a resin having a binder function. With such a rubber-based binder or a resin having a binder function, the reaction rate when deintercalating or intercalating, in the negative electrode active material layer, the chemical species that serves as the charge carrier in the secondary battery (e.g., lithium ions in a lithium ion secondary battery) can be maintained at a high level. As a result, particularly in a low-temperature environment of about −15° C., the resistance rise ratio after charge-discharge cycling can be kept low.

Here, letting the surface vicinity be a region accounting for ¼ of the thickness of the negative electrode active material layer from the surface thereof, it is preferable for the rubber-based binder and the resin having a binder function included at the surface vicinity of the negative electrode active material layer to have a combined mass concentration A and for the rubber-based binder and the resin having a binder function included in portions of the negative electrode active material layer other than the surface vicinity to have a combined mass concentration B such that the ratio A/B satisfies the condition $2.0 \leq (A/B) \leq 3.8$.

The rubber-based binder or resin having a binder function included in the binder is preferably a binder that is dispersible in an aqueous solvent. The rubber binder may be, for example, SBR. The resin having a binder function includes acrylic binders and imide binders. Here, the acrylic binder is at least one binder selected from among polyethylene oxide and polyethylene.

Preferably, the negative electrode active material particles have a tap density after 150 taps of at least 1 g/cm³. This improves peel strength of the negative electrode active material layer.

This nonaqueous secondary battery is preferably constructed as a lithium ion battery. A plurality of such nonaqueous secondary batteries may be combined to construct a battery pack. Because the above nonaqueous secondary battery and battery pack are able to hold down the resistance rise ratio in a low-temperature environment at about −15° C., they are particularly well-suited for use as vehicle drive batteries.

DESCRIPTION OF EMBODIMENTS

First, an example of the construction of a lithium ion secondary battery, as a nonaqueous secondary battery, is described. Then, while suitably referring to this example construction, a lithium ion secondary battery according to one embodiment of the invention is described. Members and features having like functions are designated by like symbols. The diagrams are drawn schematically, and do not necessarily reflect actual dimensions. The diagrams each show only examples and, unless stated otherwise, do not limit the scope of the invention.

Figure 1:
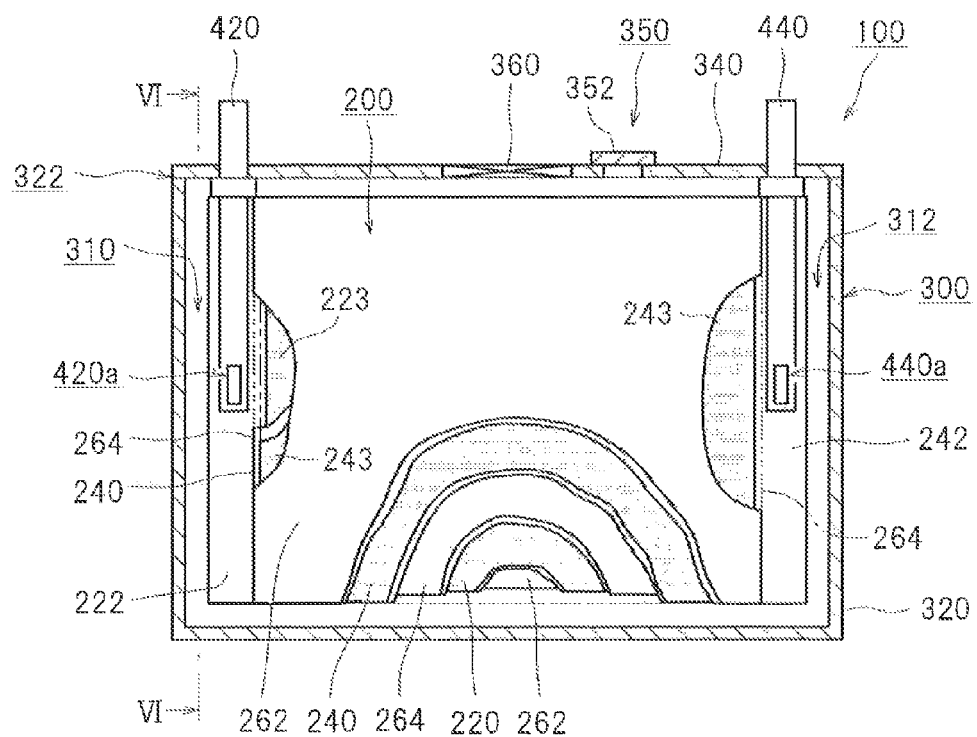
FIG. 1 is a diagram showing an example of the structure of a lithium ion secondary battery.
Figure 2:
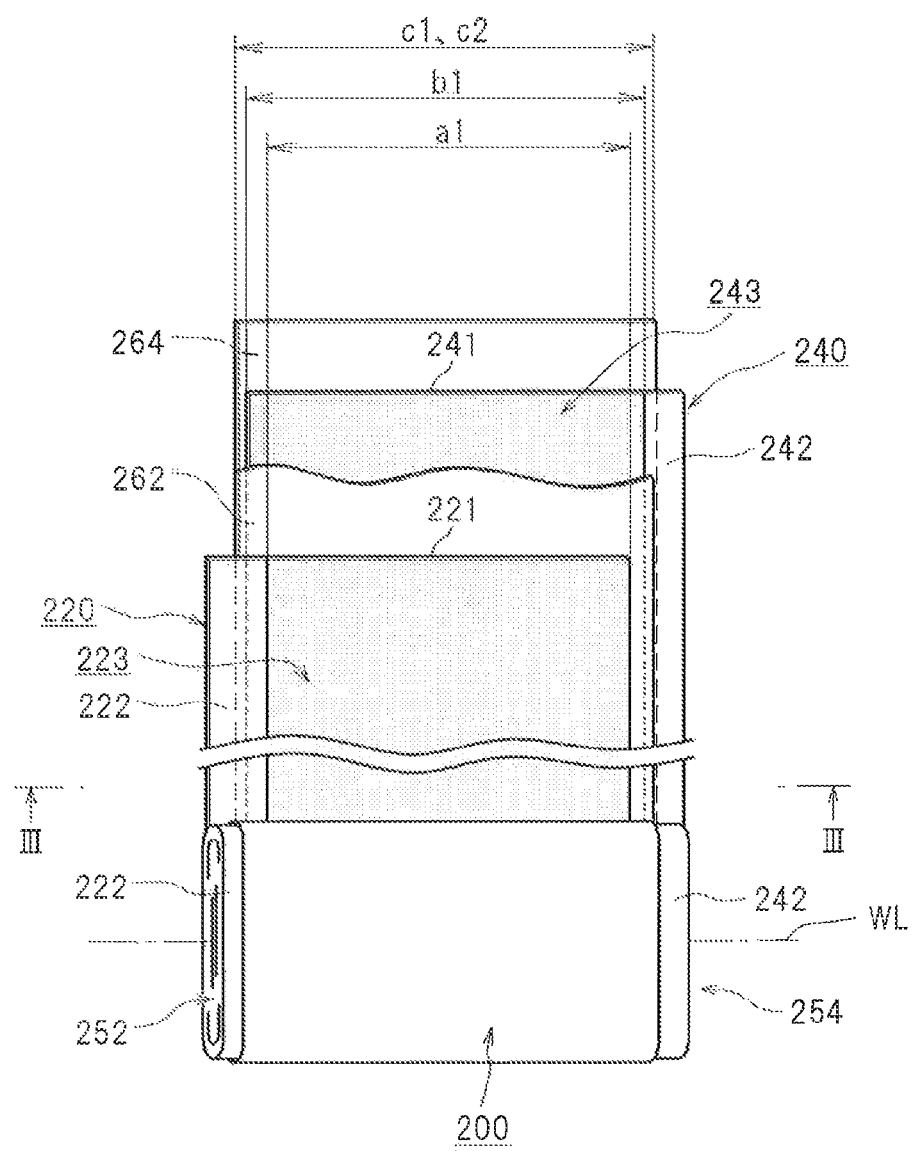
FIG. 2 is a diagram showing a coiled electrode assembly for a lithium ion secondary battery.
Figure 3:
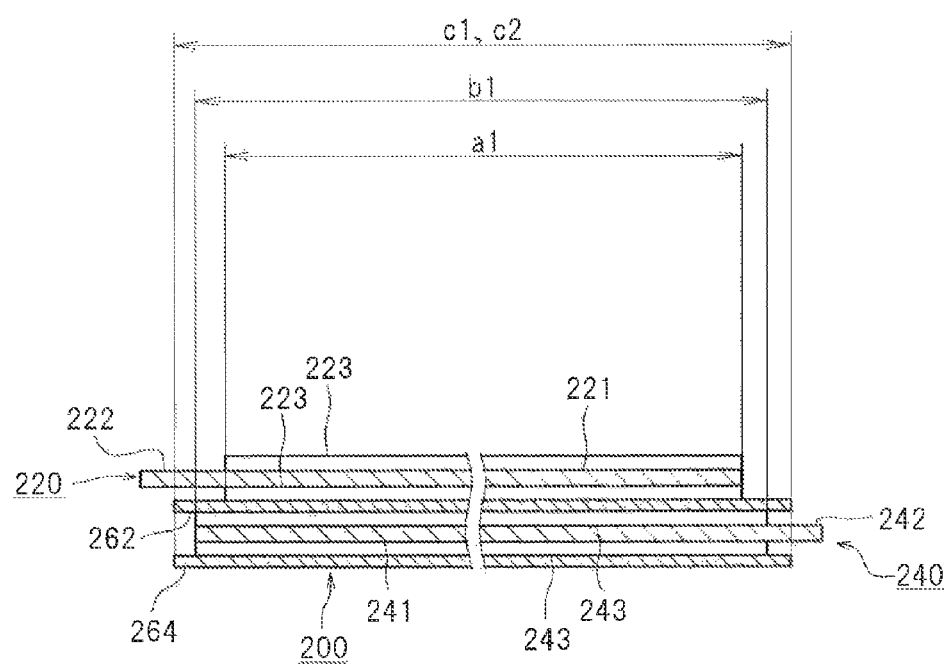
FIG. 3 is a sectional view taken along III-III in FIG. 2.

FIG. 1 shows a lithium ion secondary battery 100. This lithium ion secondary battery 100 has, as shown in FIG. 1, a coiled electrode assembly 200 and a battery case 300. FIG. 2 is a diagram showing the coiled electrode assembly 200. FIG. 3 shows a cross-section taken along III-III in FIG. 2.

The coiled electrode assembly 200 has, as shown in FIG. 2, a positive electrode sheet 220, a negative electrode sheet 240, and separators 262 and 264. The positive electrode sheet 220, the negative electrode sheet 240, and the separators 262 and 264 are each strips of sheet materials.

<<Positive Electrode Sheet 220>>

The positive electrode sheet 220 has a positive electrode current collector 221 and a positive electrode active material layer 223, each in the form of a strip. A metal foil suitable for the positive electrode may be preferably used as the positive electrode current collector 221. For example, a strip of aluminum foil having a thickness of about 15 μm may be used as the positive electrode current collector 221. An uncoated region 222 is established along the edge on one side in the width direction of the positive electrode current collector 221. In the illustrated example, positive electrode active material layers 223, as shown in FIG. 3, are held on both surfaces of the positive electrode current collector 221, except in the uncoated region 222 established on the positive electrode current collector 221. A positive electrode active material is included in the positive electrode active material layers 223. The positive electrode active material layers 223 are formed by coating a positive electrode active material-containing positive electrode mixture onto the positive electrode current collector 221.

<<Positive Electrode Active Material Layers 223 and Positive Electrode Active Material Particles 610>>

Figure 4:
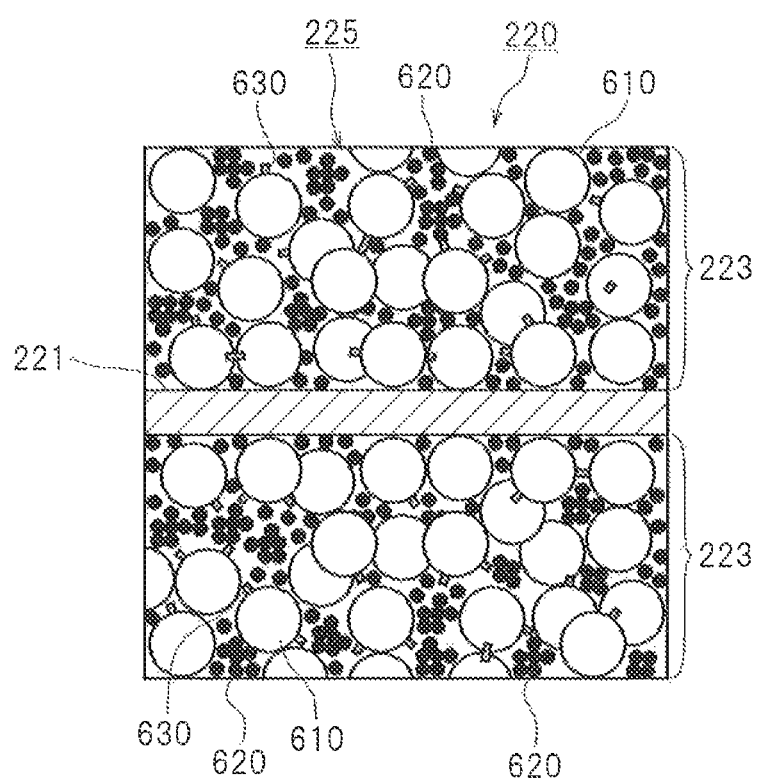
FIG. 4 is a cross-sectional view showing the structure of a positive electrode active material layer.

FIG. 4 is a cross-sectional view of the positive electrode sheet 220. In FIG. 4, the positive electrode active material particles 610, the conductive material 620 and the binder 630 within the positive electrode active material layers 223 are shown large and schematically so as to clarify the structure of the positive electrode active material layers 223. The positive electrode active material layers 223 include, as shown in FIG. 4, positive electrode active material particles 610, a conductive material 620 and a binder 630.

A substance capable of use as the positive electrode active material in a lithium ion secondary battery may be used as the positive electrode active material particles 610. Illustrative examples of positive electrode active material particles 610 include lithium-transition metal oxides such as LiNiCoMnO$_2$ (lithium nickel cobalt manganese mixed oxide), LiNiO$_2$ (lithium nickelate), LiCoO$_2$ (lithium cobaltate), LiMn$_2$O$_4$ (lithium manganate), and LiFePO$_4$ (lithium iron phosphate). Here, LiMn$_2$O$_4$ has, for example, a spinel structure. Also, LiNiO$_2$ or LiCoO$_2$ has a layered rock salt structure. LiFePO$_4$ has, for example, an olivine structure. The LiFePO$_4$ with an olivine structure may be, for example, nanometer order particles. Alternatively, the LiFePO$_4$ with an olivine structure may be additionally coated with a carbon film.

<<Conductive Material 620>>

The conductive material 620 is exemplified by carbon materials such as carbon powder and carbon fibers. The conductive material 620 may be of a single type selected from among these conductive materials and used alone, or may be of two or more types used in combination. The carbon powder used may be, for example, any of various carbon blacks (e.g., acetylene black, oil furnace black, graphitized carbon black, carbon black, graphite, ketjen black), or may be a graphite powder.

<<Binder 630>>

The binder 630 binds together the positive electrode active material particles 610 and particles of the conductive material 620 which are included in the positive electrode active material layers 223, or binds these particles with the positive electrode current collector 221. A polymer which is capable of dissolving or dispersing in the solvent used may be utilized as such a binder 630. For example, in a positive electrode mixture composition that uses an aqueous solvent, preferred use can be made of water-soluble or water-dispersible polymers such as cellulosic polymers (e.g., carboxymethylcellulose (CMC), hydroxypropyl methylcellulose (HPMC)), polyvinyl alcohol (PVA), fluoroplastics (e.g., polytetrafluoroethylene (PTFE), tetrafluoroethylene-hexafluoropropylene copolymers (FEP)), and rubbers (e.g., vinyl acetate copolymers, styrene-butadiene copolymers (SBR), and acrylic acid-modified SBR resins (SBR latex)). In a positive electrode mixture composition that uses a nonaqueous solvent, preferred use can be made of a polymer (e.g., polyvinylidene fluoride (PVDF), polyvinylidene chloride (PVDC), polyacrylonitrile (PAN)).

<<Thickener, Solvent>>

To form the positive electrode active material layers 223, a positive electrode mixture is prepared by mixing together the above-described positive electrode active material particles 610 and the conductive material 620 within a solvent to form a paste (slurry), then coating the mixture onto the positive electrode current collector 221, followed by drying and rolling. Either an aqueous solvent or a nonaqueous solvent may be used at this time as the solvent in the positive electrode mixture. A preferred example of a nonaqueous solvent is N-methyl-2-pyrrolidone (NMP). The polymer materials mentioned above as the binder 630 may be used to manifest not only the function of a binder, but also the functions of a thickener and other additives in the positive electrode mixture.

The weight ratio of the positive electrode active material as a proportion of the overall positive electrode mixture is, in general, preferably at least about 50 wt % (typically from 50 to 95 wt %), and more preferably from about 70 to about 95 wt % (e.g., from 75 to 90 wt %). The ratio of the conductive material as a proportion of the overall positive electrode mixture may be set to from about 2 to about 20 wt %; it is generally preferable to set this ratio to from about 2 to about 15 wt %. In the composition in which binder is used, the ratio of binder as a proportion of the overall positive electrode mixture may be set to from about 1 to about 10 wt %; it is generally preferable to set this ratio to from about 2 to about 5 wt %.

<<Negative Electrode Sheet 240>>

The negative electrode sheet 240 has, as shown in FIG. 2, a negative electrode current collector 241 and a negative electrode active material layer 243, each in the form of a strip. A metal foil suitable for the negative electrode may be advantageously used as the negative electrode current collector 241. For example, a strip of copper foil having a thickness of about 10 μm may be used as the negative electrode current collector 241. An uncoated region 242 is established along the edge on one side in the width direction of the negative electrode current collector 241. Negative electrode active material layers 243 are formed on both surfaces of the negative electrode current collector 241, except in the uncoated region 242 established on the negative electrode current collector 241. The negative electrode active material layers 243 are held on the negative electrode current collector 241, and include at least a negative electrode active material. The negative electrode active material layers 243 are formed by coating a negative electrode active material-containing negative electrode mixture onto the negative electrode current collector 241.

<<Negative Electrode Active Material Layer 243>>

Figure 5:
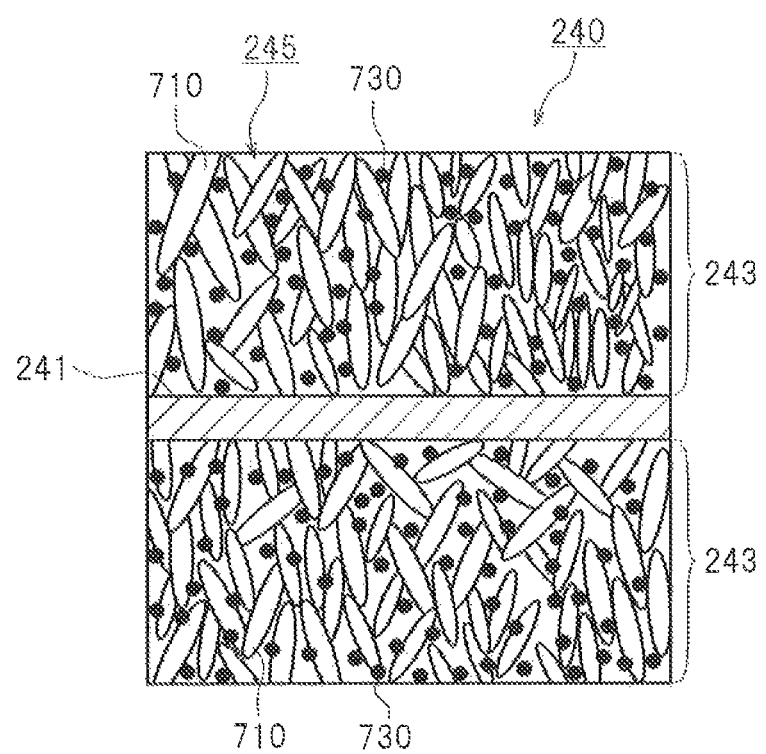
FIG. 5 is a cross-sectional view showing the structure of a negative electrode active material layer.

FIG. 5 is a cross-sectional view of the negative electrode sheet 240 in a lithium ion secondary battery 100. The negative electrode active material layers 243 include, as shown in FIG. 5, negative electrode active material particles 710, a thickener (not shown), a binder 730 and the like. In FIG. 5, the negative electrode active material particles 710 and the binder 730 within the negative electrode active material layers 243 are shown large and schematically so as to clarify the structure of the negative electrode active material layers 243.

<<Negative Electrode Active Material Particles 710>>

One, two or more types of materials hitherto used in lithium ion secondary batteries may be used without particular limitation as the negative electrode active material particles 710. Such materials are exemplified by particulate carbon materials (carbon particles) containing in at least some portion thereof a graphite structure (layer structure). More specifically, the negative electrode active material may be natural graphite, natural graphite coated with an amorphous carbon material, graphite, non-graphitizable carbon (hard carbon), graphitizable carbon (soft carbon), or a carbon material that is a combination thereof. Of these, a case in which flake graphite was used as the negative electrode active material particles 710 is shown in the diagrams, although the negative electrode active material particles 710 are not limited to the illustrated example.

Examples of other negative electrode active materials include metal compounds (preferably metal oxides) in which silicon, germanium, tin, lead, aluminum, gallium, indium, arsenic, antimony, bismuth or the like serves as the constituent metal element. Alternatively, lithium titanium oxide (LTO) may be used as the negative electrode active material particles. The negative electrode active material composed of a metal compound may be used in the form of granular bodies of excellent conductivity obtained by, for example, fully coating the surface of the metal oxide with a carbon film. In this case, a conductive material need not be included in the negative electrode active material layer, and the conductive material content may be set lower than conventional practices. Additional forms of such negative electrode active materials and features thereof such as particle size may be suitably selected according to the desired characteristics.

<<Thickener, Solvent>>

To form the negative electrode active material layers 243, a negative electrode mixture is prepared by mixing together the above-described negative electrode active material particles 710 and the binder 730 within a solvent to form a paste (slurry), then coating the mixture onto the negative electrode current collector 241, followed by drying and rolling. Either an aqueous solvent or a nonaqueous solvent may be used at this time as the solvent in the negative electrode mixture. A preferred example of a nonaqueous solvent is N-methyl-2-pyrrolidone (NMP). The polymer materials exemplified above as the binder 630 for the positive electrode active material layers 223 (see FIG. 4) may be used as the binder 730. Also, the polymer materials exemplified above as the binder 630 for the positive electrode active material layers 223 may be used to manifest not only the function of a binder, but also the functions of a thickener and other additives in the positive electrode mixture or negative electrode mixture.

<<Separators 262, 264>>

The separators 262, 264 are, as shown in FIGS. 1 and 2, components which separate the positive electrode sheet 220 and the negative electrode sheet 240. In this example, the separators 262, 264 are strips of sheet material of predetermined width which have a plurality of small pores. Separators which have a single-layer construction or a multilayer construction and are composed of, for example, a porous polyolefin resin may be used as the separators 262, 264. In this example, as shown in FIGS. 2 and 3, the negative electrode active material layers 243 have a width b1 which is a little wider than the width a1 of the positive electrode active material layers 223. In addition, the separators 262, 264 have respective widths c1, c2 which are a little wider than the width b1 of the negative electrode active material layers 243 (c1, c2>b1>a1).

In the embodiment shown in FIGS. 1 and 2, the separators 262, 264 are composed of sheet-like members. The separators 262, 264 are members which both insulate between the positive electrode active material layers 223 and the negative electrode active material layers 243, and also allow the movement of electrolyte therebetween. Hence, these are not limited to sheet-like members. Instead of sheet-like members, the separators 262, 264 may each be composed of, for example, a layer of particles with electrically insulating properties that has been formed on the surface of the positive electrode active material layers 223 or the negative electrode active material layers 243. Here, the electrically insulating particles may be composed of an electrically insulating inorganic filler (e.g., a filler such as a metal oxide or a metal hydroxide) or may be electrically insulating resin particles (e.g., particles of, for example, polyethylene, polypropylene or the like).

In this coiled electrode assembly 200, as shown in FIGS. 2 and 3, the positive electrode sheet 220 and the negative electrode sheet 240 are arranged on top of one another, with the separators 262 and 264 interposed therebetween, such that the positive electrode active material layers 223 face the negative electrode active material layers 243. More specifically, in the coiled electrode assembly 200, the positive electrode sheet 220, the negative electrode sheet 240 and the separators 262 and 264 are arranged as layers on top of one another in the following order: positive electrode sheet 220, separator 262, negative electrode sheet 240, separator 264.

Moreover, at this time, the positive electrode active material layers 223 and the negative electrode active material layers 243 face each other, with the separators 262 and 264 interposed therebetween. Also, a portion of the positive electrode current collector 221 on which the positive electrode active material layers 223 have not been formed (uncoated region 222) juts out on one side of the portion of the positive electrode current collector 221 where the positive electrode active material layers 223 face the negative electrode active material layers 243. A portion of the negative electrode current collector 241 on which the negative electrode active material layers 243 have not been formed (uncoated region 242) juts out on the side opposite from that where this uncoated region 222 juts out.

<<Battery Case 300>>

In this example, the battery case 300 is, as shown in FIG. 1, a so-called prismatic battery case, and has a container body 320 and a lid 340. The container body 320 is a flat box-like container in the shape of a square tube closed on the bottom and open on one side (the top side). The lid 340 is a member which is attached to the opening on top of the container body 320 and serves to close the opening.

In secondary batteries for installation in vehicles, to increase the fuel efficiency of the vehicle, it is desired that the weight-to-energy efficiency of the battery (battery capacity per unit weight) be increased. Accordingly, in this embodiment, a lightweight metal such as aluminum or an aluminum alloy is used in the container body 320 and the lid 340 which make up the battery case 300. By doing so, the weight-to-energy efficiency can be increased.

The battery case 300 has a flat, square interior space that serves as the space for housing the coiled electrode assembly 200. As shown in FIG. 1, the flat interior space of the battery case 300 is a little wider than the width of the coiled electrode assembly 200. In this embodiment, the battery case 300 has a container body 320 in the shape of a square tube closed on the bottom, and a lid 340 which closes the opening in the container body 320. Also, electrode terminals 420, 440 are attached to the lid 340 of the battery case 300. The electrode terminals 420, 440 pass through the battery case 300 (lid 340) and emerge outside of the battery case 300. In addition, an electrolyte injection hole 350 and a safety valve 360 are provided in the lid 340.

Figure 6:
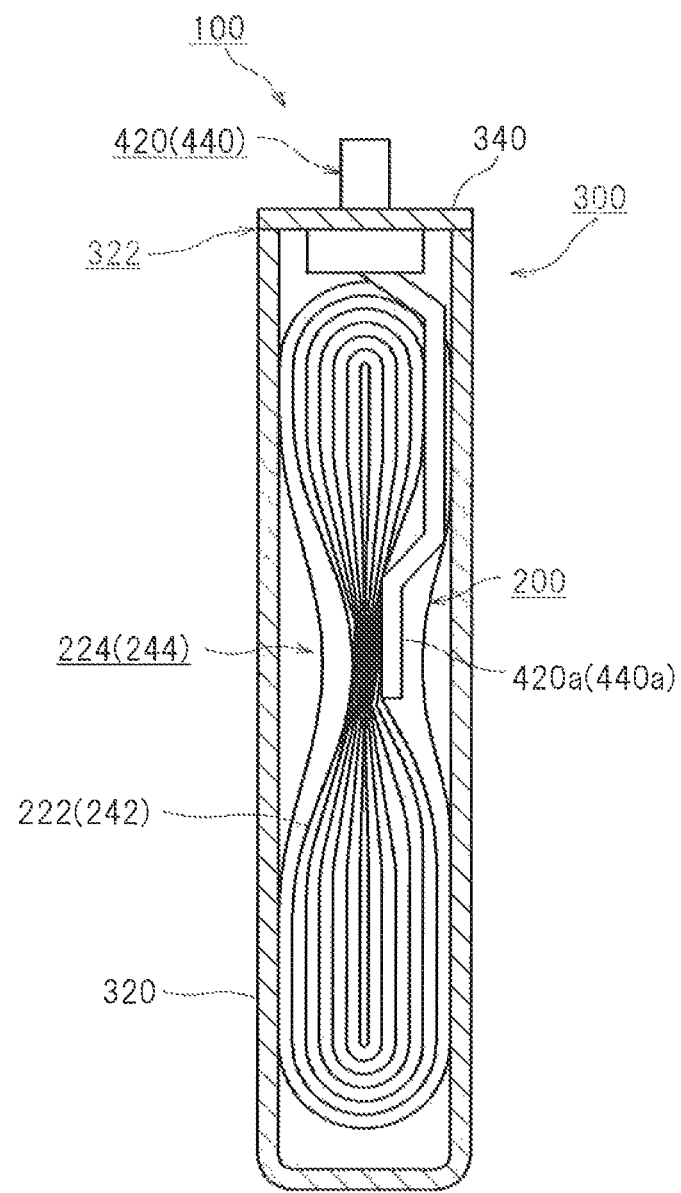
FIG. 6 is a side view showing the welding site between an uncoated region of the coiled electrode assembly and an electrode terminal.

The coiled electrode assembly 200, as shown in FIG. 2, has been bent and flattened under an applied force in a direction perpendicular to the coiling axis WL. In the example shown in FIG. 2, the uncoated region 222 of the positive electrode current collector 221 and the uncoated region 242 of the negative electrode current collector 241 are helically exposed on both sides of, respectively, the separators 262, 264. As shown in FIG. 6, in this embodiment, the middle portions 224, 244 of uncoated regions 222, 242 are gathered together and welded to the tips 420a, 440a of the electrode terminals 420, 440. At this time, due to differences in the respective materials, a technique such as ultrasonic welding is used to weld the electrode terminal 420 with the positive electrode current collector 221, and a technique such as resistance welding is used to weld the electrode terminal 440 with the negative electrode current collector 241. FIG. 6 is a side view showing the welding site between the middle portion 224 (244) of an uncoated region 222 (242) of the coiled electrode assembly 200 and an electrode terminal 420 (440), and is a cross-sectional view taken along VI-VI in FIG. 1.

The coiled electrode assembly 200 is attached, in the bent and flattened state, to the electrode terminals 420, 440 which have been fixed to the lid 340. This coiled electrode assembly 200 is, as shown in FIG. 1, housed in the flat internal space of the container body 320. After the coiled electrode assembly 200 has been placed therein, the container body 320 is closed with the lid 340. The joint 322 (see FIG. 1) between the lid 340 and the container body 320 is welded and sealed by laser welding or the like. In this example, the coiled electrode assembly 200 is positioned within the battery case 300 by the electrode terminals 420, 440 that have been fixed to the lid 340 (battery case 300).

<<Electrolyte Solution>>

Next, an electrolyte solution is injected into the battery case 300 through the electrolyte injection hole 350 provided in the lid 340. This electrolyte solution is a nonaqueous electrolyte solution, that is, an electrolyte solution in which water does not serve as the solvent. For example, the electrolyte solution used may be one obtained by including $LiPF_6$ to a concentration of about 1 mol/L within a mixed solvent of ethylene carbonate and diethyl carbonate (such as mixture of these solvents in a volumetric ratio of about 1:1). After the electrolyte solution has been injected, a sealing cap 352 made of metal is attached to the electrolyte injection hole 350 (such as by welding), thereby sealing the battery case 300. The electrolyte solution is not limited to the electrolyte solution mentioned here by way of illustration. For example, nonaqueous electrolyte solutions that have hitherto been used in lithium ion secondary batteries may be suitably used here as the electrolyte solution.

<<Pores>>

The positive electrode active material layers 223 have small gaps 225 (see FIG. 4) which might also be called cavities between the positive electrode active material particles 610, particles of the conductive material 620 and the like. The electrolyte solution (not shown) is able to infiltrate into these small gaps in the positive electrode active material layers 223. Similarly, the negative electrode active material layers 243 have small gaps 245 (see FIG. 5) which might also be called cavities between, for example, the negative electrode active material particles 710. These gaps 225, 245 (cavities) are suitably referred to here as "pores." In the coiled electrode assembly 200, as shown in FIG. 2, the uncoated regions 222, 242 are helically coiled on both sides along the coiling axis WL. Electrolyte solution is able to infiltrate through gaps in the uncoated regions 222, 242 on both sides 252, 254 along this coiling axis WL. The electrolyte solution thereby penetrates throughout the positive electrode active material layers 223 and the negative electrode active material layers 243 at the interior of the lithium ion secondary battery 100.

<<Gas-Venting Paths>>

In this example, the flat interior space of the battery case 300 is a little wider than the coiled electrode assembly 200 which has been flattened. On both sides of the coiled electrode assembly 200, gaps 310, 312 are provided between the coiled electrode assembly 200 and the battery case 300. The gaps 310, 312 serve as paths for venting gases. In cases where overcharging has occurred, for example, the temperature of the lithium ion secondary battery 100 becomes abnormally high, whereupon the electrolyte solution decomposes and the abnormal generation of gas may occur. In this embodiment, such abnormally generated gases move toward the safety valve 360 by passing through the gaps 310, 312 between the coiled electrode assembly 200 and the battery case 300 on both sides of the coiled electrode assembly 200, and are discharged outside of the battery case 300 through the safety valve 360.

In this lithium ion secondary battery 100, the positive electrode current collector 221 and the negative electrode current collector 241 are electrically connected to an external device via the electrode terminals 420, 440 which pass through the battery case 300. The operation of the lithium ion secondary battery 110 during charging and discharging is described below.

<<Operation During Charging>>

Figure 7:
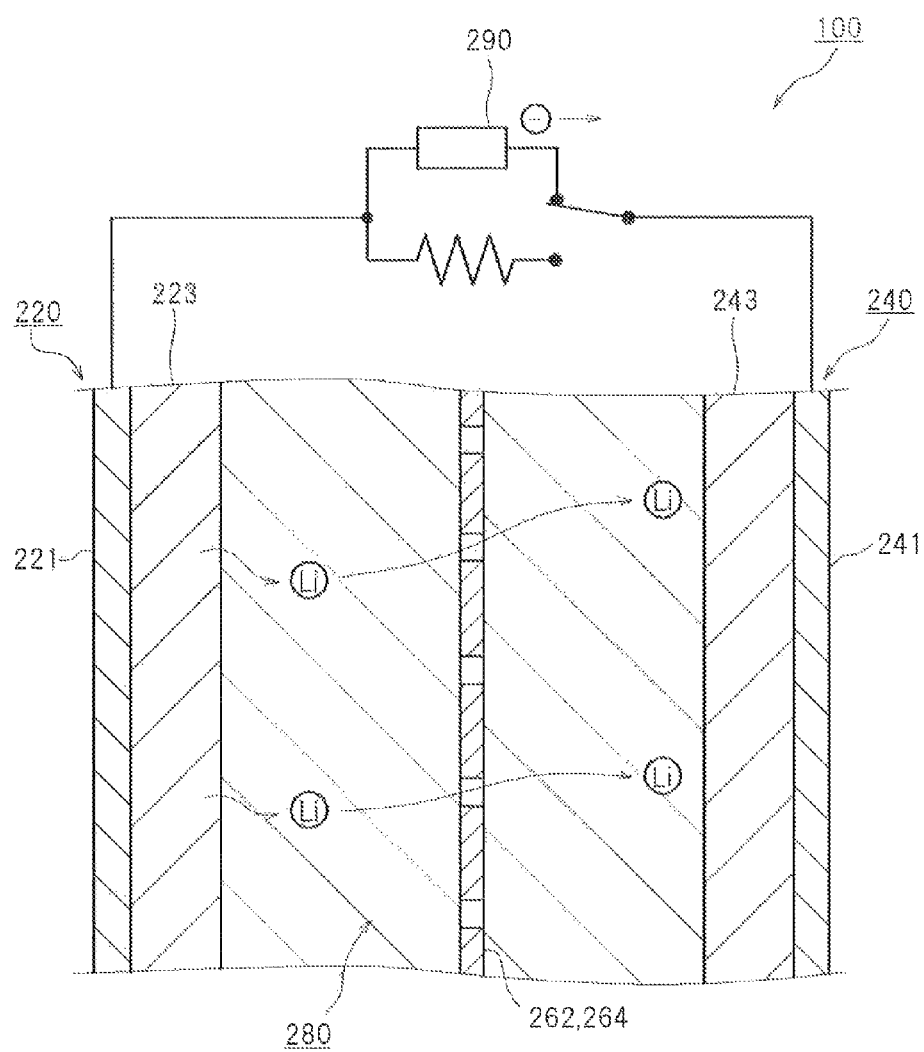
FIG. 7 is a schematic view showing the state of a lithium ion secondary battery during charging.

FIG. 7 schematically shows the state during charging of the lithium ion secondary battery 100. During charging, as shown in FIG. 7, the electrode terminals 420, 440 of the lithium ion secondary battery 100 (see FIG. 1) are connected to a charger 290. Under the action of the charger 290, during charging, lithium ions (Li) are released into the electrolyte solution 280 from the positive electrode active material within the positive electrode active material layer 223. At the same time, electrical charges are released from the positive electrode active material layer 223. The charges that have been released pass through the conductive material (not shown) and are sent to the positive electrode current collector 221, from which they then pass through the charger 290 and are sent to the negative electrode sheet 240. The charges are collected at the negative electrode sheet 240, together with which lithium ions (Li) within the electrolyte solution 280 are absorbed by the negative electrode active material within the negative electrode active material layer 243 and stored.

<<Operation During Discharge>>

Figure 8:
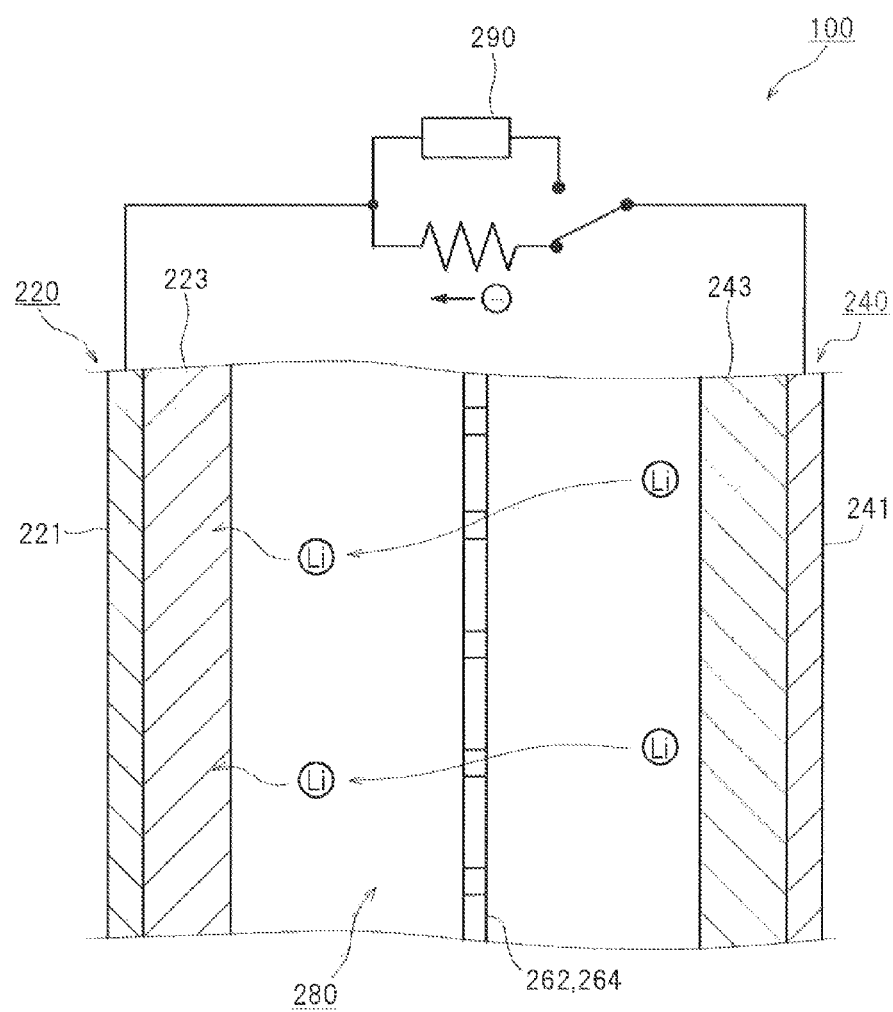
FIG. 8 is a schematic view showing the state of a lithium ion secondary battery during discharging.

FIG. 8 schematically shows the state during discharge of the lithium ion secondary battery 100. During discharge, as shown in FIG. 8, electric charges are sent from the negative electrode sheet 240 to the positive electrode sheet 220, along with which lithium ions that have been stored in the negative electrode active material layer 243 are released into the electrolyte solution 280. Also, at the positive electrode, lithium ions within the electrolyte solution 280 are taken up into the positive electrode active material within the positive electrode active material layer 223.

Lithium ions thus move back and forth between the positive electrode active material layer 223 and the negative electrode active material layer 243 by passing through the electrolyte solution 280 during charging and discharging of the lithium ion secondary battery 100. Also, during charging, electrical charges are sent from the positive electrode active material to the positive electrode current collector 221 by passing through the conductive material. By contrast, during discharging, electrical charges are returned from the positive electrode current collector 221 to the positive electrode active material by passing through the conductive material.

Smoother movement of lithium ions and smoother movement of electrons during charging is thought to enable efficient and rapid charging. Smoother movement of lithium ions and smoother movement of electrons during discharging is thought to lower battery resistance, increase the level of discharge and increase battery power.

<<Other Battery Configurations>>

An example of a lithium ion secondary battery has been described above, although the lithium ion secondary battery is not limited to the foregoing configuration. Also, electrode sheets obtained by similarly coating an electrode mixture onto metal foil may be used in various other battery configurations. For example, other known battery configurations include cylindrical batteries and laminated batteries. Cylindrical batteries are batteries in which the coiled electrode assembly is housed in a cylindrical battery case. Laminated batteries are batteries in which the positive electrode sheet and the negative electrode sheet are laminated together, with a separator therebetween.

A lithium ion secondary battery is described below as a nonaqueous secondary battery according to an embodiment of the invention. In the description that follows, members and portions having the same functions as in the above-described lithium ion secondary battery 100 are designated by like symbols, and reference is made, as needed, to the diagram of the above-described lithium ion secondary battery 100.

<<Lithium Ion Secondary Battery 100A>>

Figure 9:
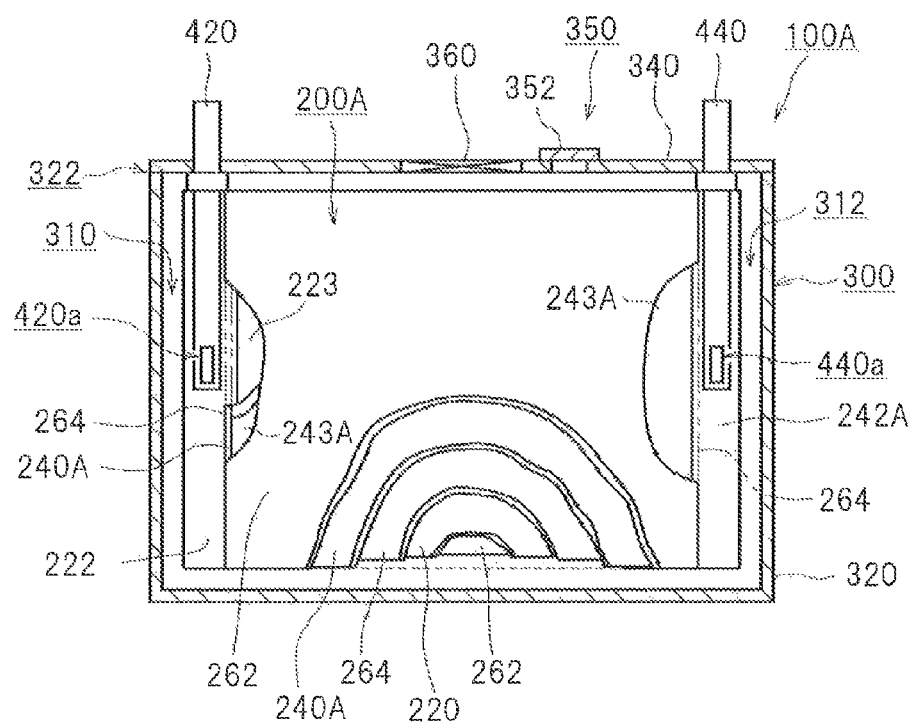
FIG. 9 is a diagram showing a lithium ion secondary battery 100A according to an embodiment of the invention.
Figure 10:
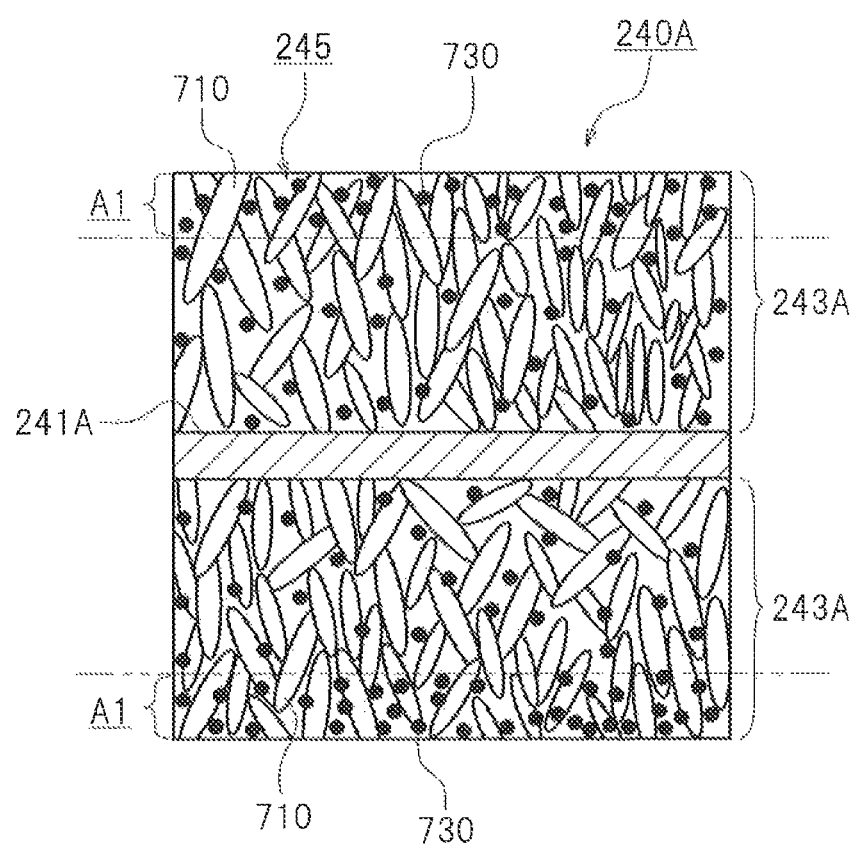
FIG. 10 is a diagram showing the structure of a negative electrode active material layer 243A in this lithium ion secondary battery 100A.

FIG. 9 shows a lithium ion secondary battery 100A serving as an embodiment of the nonaqueous secondary battery disclosed herein. FIG. 10 shows the structure of the negative electrode active material layer 243A in this lithium ion secondary battery 100A.

As shown in FIG. 9, the lithium ion secondary battery 100A has a negative electrode current collector 241A, and a negative electrode active material layer 243A held by the negative electrode current collector 241A. As shown in FIG. 10, the negative electrode active material layer 243A includes negative electrode active material particles 710 and a binder 730. In this embodiment, the binder 730 includes a rubber-based binder or a resin having a binder function (e.g., an acrylic binder or an imide binder). In addition, the rubber-based binder or the resin having a binder function is abundantly included, within the negative electrode active material layer 243A, in a surface vicinity of the negative electrode active material layer 243A. With such a nonaqueous secondary battery, the reaction rate of lithium ion deintercalation and intercalation in the negative electrode active material layer 243A can be kept high. This is turn makes it possible to hold down the resistance rise ratio after charge-discharge cycling in a low-temperature environment at about −15° C. Herein below, the above nonaqueous secondary battery is explained in detail.

<<Negative Electrode Active Material Layer 243A>>

The negative electrode active material layer 243A includes a rubber-based binder or a resin having a binder function (e.g., polyethylene oxide (PEO), polyethylene (PE), acrylic binder, imide binder). An example of a rubber-based binder is styrene-butadiene rubber (SBR). SBR, PEO and PE are all binders which are dispersible in an aqueous solvent. The imide binder may be an imide binder capable of being used as the binder in the negative electrode active material layer 243A of a nonaqueous secondary battery. Such imide binders are exemplified by polyamide-imides.

In this embodiment, as shown in FIG. 10, the binder 730 which is a rubber-based binder or a resin having a binder function is abundantly included, within the negative electrode active material layer 243A, in the surface vicinity A1 of the negative electrode active material layer 243A. That is, the mass concentration of rubbery binder or resin having a binder resin is higher in the surface vicinity A1 of the negative electrode active material layer 243A than in other portions of the negative electrode active material layer 243A.

Here, the surface vicinity A1 of the negative electrode active material layer 243A is defined as a region accounting for ¼ of the thickness of the negative electrode active material layer 243A from the surface thereof. The rubber-based binder and the resin having a binder function included in the surface vicinity A1 of the negative electrode active material layer 243A have a combined mass concentration A and the rubber-based binder and the resin having a binder function included in portions of the negative electrode active material layer 243A other than the surface vicinity A1 have a combined mass concentration B such that the ratio A/B is from about 2.0 to about 3.8 ($2.0 \leq (A/B) \leq 3.8$).

That is, in this lithium ion secondary battery 100A, the rubber-based binder or the resin having a binder function is disproportionately distributed in the surface vicinity A1 of the negative electrode active material layer 243A. As mentioned above, when the surface vicinity A1 of the negative electrode active material layer 243A is defined as a region accounting for ¼ of the thickness of the negative electrode active material layer 243A from the surface thereof, the ratio A/B of the combined mass concentration A of the rubber-based binder and the resin having a binder function included in the surface vicinity A1 of the negative electrode active material layer 243A to the combined mass concentration B of the rubber-based binder and the resin having a binder function included in portions of the negative electrode active material layer 243A other than the surface vicinity A1 is from about 2.0 to about 3.8. This means that the rubber-based binder and the resin having a binder function are present in the surface vicinity A1 of the negative electrode active material layer 243A in a considerable abundance which is from about 2 times to about 3.8 times the level in portions of the negative electrode active material layer 243A other than the surface vicinity A1.

In the lithium ion secondary battery 100A, as noted above, the rubber-based binder and the resin having a binder function are highly disproportionately present in the surface vicinity A1 of the negative electrode active material layer 243A. Because of this, the reaction rate of lithium ion deintercalation and intercalation in the negative electrode active material layer 243A can be kept high. In particular, in a low-temperature environment at about −15° C., the resistance of the lithium ion secondary battery 110A can be held low in applications where charging and discharging is continuously repeated at a high rate.

The inventors have conjectured the following concerning this effect.

Ordinarily, the rubber-based binder and the resin having a binder function are not disproportionately present to a high degree in the surface vicinity A1 of the negative electrode active material layer 243A as described above. In this case, the sites where lithium ions deintercalate and intercalate are not uniformly present at the surface of the negative electrode active material layer 243 (see FIG. 7 or 8). That is, sites where lithium ions deintercalate and intercalate with relative ease and sites where lithium ions deintercalate and intercalate with relative difficulty are both present at the surface of the negative electrode active material layer 243A. Given such lack of uniformity in the intercalation and deintercalation of lithium ions at the surface of the negative electrode active material layer 243A, there similarly emerge, in the facing positive electrode active material layer 223 (see FIG. 7 or FIG. 8), both sites where the battery reactions proceed with relative ease and sites where the battery reactions proceed with relative difficulty. Moreover, when there is a lack of uniformity in the intercalation and deintercalation of lithium ions at the surface of the negative electrode active material layer 243A, this becomes a factor in the resistance rise ratio of the battery overall. It is not precisely known what causes the lack of uniformity in the intercalation and deintercalation of lithium ions at the surface of the negative electrode active material layer 243.

In the lithium ion secondary battery 100A described above, the rubber-based binder and the resin having a binder function are very disproportionally present in the surface vicinity A1 of the negative electrode active material layer 243A. In this case, the flow of lithium ions which deintercalate from the negative electrode active material particles 710 in the negative electrode active material layer 243A is rectified by the rubber-based binder and the resin having a binder function which are very disproportionally present in the surface vicinity A1 of the negative electrode active material layer 243A. Also, the points where the lithium ions are intercalated also appear to be, in general, uniformly distributed at the surface of the negative electrode active material layer 243A. The lack of uniformity in the intercalation and deintercalation of lithium ions at the surface of the negative electrode active material layer 243A is thereby resolved, and the intercalation and deintercalation of lithium ions proceeds with relative uniformity at the surface of the negative electrode active material layer 243A. When the intercalation and deintercalation of lithium ions is carried out with general uniformity at the surface of the negative electrode active material layer 243A, the battery reactions proceed more uniformly in the facing positive electrode active material layer 223 (see FIG. 7 or FIG. 8) as well, which in turn enables the resistance of the battery as a whole to be held down. This, in any case, is what the inventors think is happening.

To form the negative electrode active material layer 243A, a negative electrode mixture is prepared by, for example, mixing together negative electrode active material particles 710 and a binder 730 within a solvent to form a paste (slurry), coating the mixture onto the negative electrode current collector 241, then drying and rolling. In this forming method, migration arises in the drying step. Due to migration, the rubber-based binder and the resin having a binder function move somewhat to the surface vicinity A1 of the electrode active material layer 243A. Generally, however, the rubber binder and the resin having a binder function do not attain, in the surface vicinity A1 of the negative electrode active material layer 243A, a level of from about 2 times to about 3.8 times the level of these ingredients in other portions of the negative electrode active material layer 243A.

In this embodiment, a negative electrode mixture is prepared by mixing together the negative electrode active material particles 710 and the binder 730 within a solvent to form a paste (slurry). Here, an aqueous solvent was used as the solvent and the amount of solvent was relatively large with respect to the negative electrode active material particles 710 and the binder 730. Furthermore, in the drying step, a high drying temperature was used. This facilitated migration, setting the level of rubber-based binder and resin having a binder function in the surface vicinity A1 of the negative electrode active material layer 243A to from about 2 times to about 3.8 times the level in other portions of the negative electrode active material layer 243A.

More specifically, in this embodiment, the mass ratio among the negative electrode active material particles 710, CMC as the thickener and the binder 730 was set to negative electrode active material particles 710:CMC:binder 730=98:1:1. Pure water was added as the solvent for the negative electrode mixture. In this case, the negative electrode mixture to be coated was adjusted so that, using as a viscosity measurement meter a Brookfield viscometer, the viscosity of the negative electrode mixture at room temperature (here, 25° C.) becomes about 3,000 mPa·s (20 rpm). Also, in the drying step, migration was promoted by immediately placing the negative electrode mixture, after coating, in a drying atmosphere.

Moreover, migration here was strongly encouraged, bringing the level of rubber-based binder and resin having a binder function at the surface vicinity A1 of the negative electrode active material layer 243A to from about 2 times to about 3.8 times the level as in other areas of the negative electrode active material layer 243A. Formation of the negative electrode active material layer 243A is not limited to this method.

A method that strongly encourages migration was mentioned here as the method of forming the negative electrode active material layer 243A, but the method of forming the negative electrode active material layer 243A is not limited to this method. Another exemplary method of forming the negative electrode active material layer 243A involves applying the negative electrode mixture a plurality of times (in other words, at least two times). In such a case, it is desirable for the proportion of rubber-based binder and resin having a binder function to be made higher in the negative electrode mixture which is applied the second and subsequent times and can be formed in the surface vicinity of the negative electrode active material layer 243A.

Hence, in this embodiment, in the surface vicinity A1 of the negative electrode active material layer 243A, the rubber-based binder and the resin having a binder function were set to a level of from about 2 times to about 3.8 times that in other portions of the negative electrode active material layer 243A.

To determine how the rubber-based binder and the resin having a binder function are distributed within the negative electrode active material layer 243A, it is desirable here to make use of EDX analysis (energy dispersive analysis of x-rays, or "EDAX") based on a sectional scanning electron microscopic (SEM) image of the negative electrode active material layer 243A that has been formed. Based on this technique, it is possible to identify how the rubber-based binder and the resin having a binder function are distributed within the negative electrode active material layer 243A.

For example, in a case where SBR is included as a rubber-based binder in the negative electrode active material layer 243A, first the SBR is dyed with bromine (Br), following which the distribution of Br within the negative electrode active material layer 243A is determined by energy-dispersive x-ray analysis. It is possible in this way to learn how SBR is distributed within the negative electrode active material layer 243A.

The energy dispersive x-ray analyzer (EDX analyzer) used here was a MACHS 200 manufactured by Shimadzu Corporation.

Acceleration voltage: 15 kV
Working distance (WD): about 10 mm
Probe current: 60 nA to 70 nA
Magnification: 1,000×

The distribution not only of SBR, but also of binder within the negative electrode active material layer can be determined by EDX analysis. Here, letting A be the combined mass concentration of the rubber-based binder and the resin having a binder function included at the surface vicinity A1 of the negative electrode active material layer 243A and B be the combined mass concentration of the rubber-based binder and the resin having a binder function included in portions of the negative electrode active material layer 243A other than the surface vicinity A1, the ratio A/B should be from about 2.0 to about 3.8 ($2.0 \leq (A/B) \leq 3.8$). It is possible in this way to, for example, hold down the resistance rise ratio after charge-discharge cycling in which charging and discharging are continuously repeatedly.

<<Test Cell>>

Test cells having differing A/B ratios were fabricated. The resistance rise ratio following given charge-discharge cycling was evaluated for each test cell. The test cells were constructed as type 18650 cells. In addition, Samples A to C having different negative electrode active material layer structures were prepared for the test cells. Sample A is described below, and Samples B and C are also described in turn.

<<Positive Electrode of Test Cells>>

A positive electrode mixture was prepared for use in forming the positive electrode active material layer in the positive electrode. In the positive electrode mixture, a ternary lithium transition metal oxide ($LiN_{1/3}Co_{1/3}Mn_{1/3}O_2$) was used as the positive electrode active material, acetylene black (AB) was used as the conductive material, and polyvinylidene fluoride (PVDF) was used as the binder. Here, the positive electrode active material, the conductive material and the binder were set to a mass ratio of positive electrode active material:conductive material:binder=91:6:3. The positive electrode mixture was prepared by mixing the positive electrode active material, the conductive material and the binder together with ion-exchanged water. Next, the positive electrode mixture was coated onto both sides of a positive electrode current collector and dried. Here, an aluminum foil (thickness, 15 µm) was used as the positive electrode current collector. A positive electrode (positive electrode sheet) having a positive electrode active material layer on both sides of a positive electrode current collector was thus produced. The positive electrode sheet was dried, following which it was rolled with a roller press to a thickness of 110 µm. The coating weight of the positive electrode mixture on the positive electrode current collector was set such that, after the positive electrode mixture had dried, the weight of the positive electrode active material layer per unit surface area of the positive electrode current collector became 25 mg/cm².

<<Negative Electrode of Test Cell (Sample A)>>

This is described here first with regard to Sample A. In Sample A, the negative electrode mixture was prepared using natural graphite in the form of flakes as the negative electrode active material, using carboxymethylcellulose (CMC) as the thickener, and using also a binder. In Sample A, styrene-butadiene rubber (SBR), which is a rubber-based binder, was used as the binder.

Here, in Sample A, the negative electrode active material, the thickener (CMC) and the binder (SBR) were set to a mass ratio of negative electrode active material:CMC:SBR=98:1:1. A negative electrode mixture was prepared by mixing the negative electrode active material, CMC and SBR together with an ion-exchanged water. Next, the negative electrode mixture was coated onto both sides of the negative electrode current collector and dried. Here, a copper foil (thickness, 10 µm) was used as the negative electrode current collector. A negative electrode (negative electrode sheet) having a negative electrode active material layer on both sides of the negative electrode current collector was thereby produced. The negative electrode sheet was dried, following which it was rolled with a roller press to a thickness of 100 µm. The thickness of the negative electrode active material layer formed on each side of the negative electrode current collector was set to 45 µm. The coating weight of the negative electrode mixture on the negative electrode current collector was set such that, after the negative electrode mixture had dried, the weight of the negative electrode active material layer per unit surface area of the negative electrode current collector became 13 mg/cm².

<<Test Cell Separator>>

A separator composed of a porous sheet having a three-layer structure (PP/PE/PP) of polypropylene (PP) and polyethylene (PE) was used.

<<Assembly of Test Cells>>

Type 18650 cells (lithium ion batteries) for testing were built using the negative electrode, positive electrode and separator produced as described above. A coiled electrode assembly of cylindrical shape was produced by laminating and coiling the positive electrode sheet and the negative electrode sheet with a separator interposed therebetween. The coiled electrode assembly was placed in a battery case of cylindrical shape, following which a nonaqueous electrolyte solution was injected and the battery case was sealed, thereby completing construction of the test cell. The nonaqueous electrolyte solution used here was an electrolyte solution obtained by dissolving 1 mol/L (lithium salt basis) of $LiPF_6$ in a mixed solvent composed of ethylene carbonate (EC), diethyl carbonate (DMC) and ethyl methyl carbonate (EMC) in a given volumetric ratio (EC:DMC:EMC=3:4:3).

Samples A to C are each described in detail below.

<<Sample A (Binder: SBR; Thickness of Negative Electrode Active Material Layer: 45 µm)>>

As described above, in Sample A, the rubber-based binder styrene-butadiene rubber (SBR) is used as the binder in the negative electrode active material layer. The thickness of the negative electrode active material layer formed on each side of the negative electrode current collector was 45 µm.

A plurality of Sample A test cells were prepared in which the ratio A/B of the mass concentration A of SBR included in the surface vicinity A1 of the negative electrode active material layer to the mass concentration B of SBR included in portions other than the surface vicinity A1 of the negative electrode active material layer was varied. The resistance rise ratio following continuous charging and discharging was measured for each of the test cells.

The ratio A/B, via preparation of the negative electrode mixture when forming the negative electrode active material layer and suitable adjustment of the conditions in the subsequent drying step, regulated the degree of migration. Here, the surface vicinity A1 of the negative electrode active material layer was defined as a region accounting for ¼ of the thickness of the negative electrode active material layer from the surface thereof. This applies also to Samples B and C.

<<Sample B (Binder: PVDF; Thickness of Negative Electrode Active Material Layer: 45 µm)>>

In Sample B, PVDF was used instead of SBR as the binder included in the negative electrode active material layer. With the use of PVDF, the nonaqueous solvent N-methyl-2-pyrrolidone (NMP) was used as the solvent when preparing the negative electrode mixture. The negative electrode active material and the binder (PVDF) were set to a mass ratio of negative electrode active material:PDVF=98:2. Here, aside from the use of PVDF as a binder, the construction was largely the same as in samples obtained using SBR.

A plurality of Sample B test cells were prepared in which the ratio A/B of the mass concentration A of PVDF included in the surface vicinity A1 of the negative electrode active material layer to the mass concentration B of PVDF included in portions other than the surface vicinity A1 of the negative electrode active material layer was varied. The resistance rise ratio following continuous charging and discharging was measured for each of the test cells.

<<Sample C (Binder: SBR; Thickness of Negative Electrode Active Material Layer: 75 µm)>>

Samples formed so that the thickness of the negative electrode active material layer becomes about 75 µm on each side of the negative electrode current collector were prepared. The coating weight of negative electrode mixture on the negative electrode current collector was set such that, after drying of the negative electrode mixture, the weight of the negative electrode active material layer per unit surface area of the negative electrode current collector becomes 20 mg/cm².

A plurality of Sample C test cells were prepared in which the ratio A/B of the mass concentration A of SBR included in the surface vicinity A1 of the negative electrode active material layer to the mass concentration B of SBR included in portions other than the surface vicinity A1 of the negative electrode active material layer was varied. The resistance rise ratio following continuous charging and discharging was measured for each of the test cells.

<<Ratio A/B>>

Here, the ratio A/B of the mass concentration A of binder included in the surface vicinity A1 of the negative electrode active material layer 243A to the mass concentration B of binder included in portions other than the surface vicinity A1 of the negative electrode active material layer 243A was determined for each sample. This ratio A/B can be measured, as described above, by EDX analysis (EDAX).

<<Resistance Rise Ratio (Resistance Rise Ratio (%) after Charge/Discharge Cycling)>>

Each of the test cells for Samples A to C, after being subjected to predetermined conditioning, is adjusted to a state of charge (SOC) of 60% and the initial resistance V1 is measured. Next, charging and discharging are continuously repeated for a given number of charge-discharge cycles in a −15° C. temperature environment. The resistance (resistance after cycling V2) is measured before and after the implementation of charge-discharge cycles. Here, the resistance rise ratio V is the ratio (V2/V1) of the resistance after cycling V2 to the initial resistance V1.

<<Conditioning>>

Here, conditioning is carried out by the following Steps 1 and 2.

Step 1: Constant-current charging at 1 C until 4.1 V is reached, followed by 5 minutes of rest.

Step 2: After Step 1, constant-voltage charging for 1.5 hours, followed by 5 minutes of rest.

With such conditioning, the required reactions arise due to initial charging, and a gas is generated. In addition, the required film forms on, for example, the negative electrode active material layer.

<<Measurement of Rated Capacity>>

After the above conditioning, the rated capacity of the test cell is measured. The rated capacity is measured by the following Steps 1 to 3. To keep influence by temperature here uniform, the rated capacity is measured in a 25° C. temperature environment.

Step 1: Constant-current discharge at 1 C until 3.0 V is reached, followed by 2 hours of constant-voltage discharge, then 10 seconds of rest.

Step 2: Constant-current charging at 1 C until 4.1 V is reached, followed by 2.5 hours of constant voltage discharging, then 10 seconds of rest.

Step 3: Constant-current discharge at 0.5 C until 3.0 V is reached, followed by 2 hours of constant-voltage discharge, then 10 seconds of rest.

Here, the discharge capacity in discharge from constant-current discharge to constant-voltage discharge in Step 3 (CCCV discharge capacity) is treated as the "rated capacity."

<<SOC Adjustment>>

The state of charge (SOC) is adjusted by following Steps 1 and 2 below. Here, SOC adjustment should be carried out following the above conditioning step and measurement of the rated capacity. Also, to keep the influence by temperature here uniform, SOC adjustment is carried out in a 25° C. temperature environment.

Step 1: Charging is carried out from 3V at a constant current of 1 C, thereby setting the state of charge to about 60% of the rated capacity (SOC 60%).

Step 2: Following Step 1, constant-voltage charging is carried out for 2.5 hours.

The test cell can thus be adjusted to a desired state of charge. Mention has been made here of a case in which the SOC is adjusted to 60%, although adjustment to any state of charge is possible by changing the state of charge in Step 1. For example, in a case where the state of charge is to be adjusted to 80%, the test cell should be set to a state of charge which is 80% of the rated capacity (SOC 80%).

<<Charge-Discharge Cycling>>

In charge-discharge cycling, first the test cell is adjusted to SOC 60%. One charge-discharge cycle consists here of 10 seconds of constant-current discharging at 30 C and 1 minute (60 seconds) of constant-current charging at 5 C. The test cell is rested for 10 minutes in each cycle between such discharging and charging. Charge-discharge cycling is carried out for 3,000 cycles while adjusting the test cell to SOC 60% every 500 cycles.

<<IV Resistance Measurement>>

In IV resistance measurement, the initial resistance before charge-discharge cycling and the resistance after charge-discharge cycling are measured. The resistance is evaluated as the IV resistance. Resistance measurement is carried out in a 25° C. temperature environment, with each test cell being adjusted to SOC 60%. The test cell is then rested for 10 minutes, and subsequently discharged for 10 seconds at a constant current of 30 C (CC discharge). Here, the lower-limit voltage during discharge was set to 3.0 V.

Figure 11:
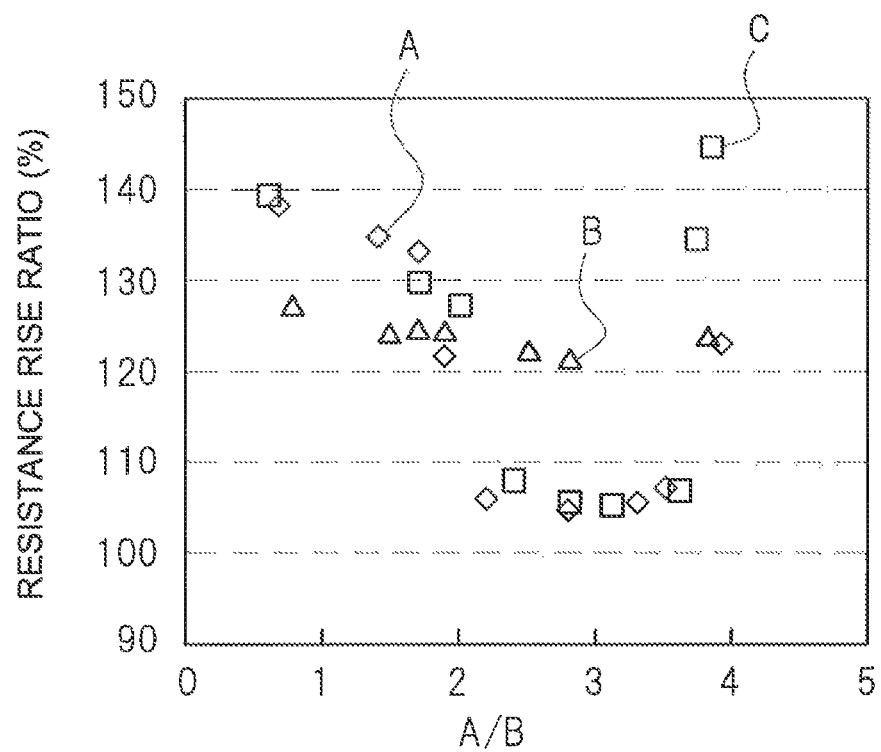
FIG. 11 is a graph showing the relationship between the ratio A/B and the resistance rise ratio (%) after charge-discharge cycling for the test cells of Samples A to C.

FIG. 11 shows the relationship between the above-described ratio A/B and the resistance rise ratio (%) after charge-discharge cycling for test cells of the respective Samples A to C. Here, diamonds (◊) are used to plot Sample A test cells, triangles (Δ) are used to plot Sample B test cells, and squares (□) are used to plot Sample C test cells.

<<Sample A>>

Sample A uses SBR as the binder in the negative electrode active material layer and the negative electrode active material layers have a thickness of about 45 μm. In FIG. 11, test cells of Sample A are shown plotted with "◊" symbols. In this case, in Sample A when the ratio A/B of the mass concentration A of SBR included in the surface vicinity A1 of the negative electrode active material layer to the mass concentration B of SBR included in portions other than the surface vicinity of the negative electrode active material layer is from about 2.0 to about 3.8 (2.0≤(A/B)≤3.8), the resistance rise ratio (%) after charge-discharge cycling tends to be kept low. When this ratio A/B is lower than 2.0, or when A/B is higher than 3.8, the resistance rise ratio (%) after charge-discharge cycling tends to rise.

<<Sample B>>

Sample B uses PVDF as the binder included in the negative electrode active material layer, and the negative electrode active material layers have a thickness of 45 μm. In FIG. 11, test cells of Sample B are shown plotted with "Δ" symbols. In this case, when the ratio A/B is from about 2.0 to about 3.8 (2.0≤(A/B)≤3.8), a tendency for the resistance rise ratio (%) after charge-discharge cycling to be kept low is not apparent.

<<Sample C>>

Sample C uses SBR as the binder included in the negative electrode active material layer, and the negative electrode active material layers have a thickness of 75 μm. In FIG. 11, test cells of Sample C are shown plotted with "□" symbols. In this case, for Sample C as well, when the ratio A/B is from about 2.0 to about 3.8 (2.0≤(A/B)≤3.8), a tendency for the resistance rise ratio (%) after charge-discharge cycling to be kept low is apparent.

<<Trend in Resistance Rise Ratio (%) after Charge-Discharge Cycling>>

As shown with Samples A and B, when SBR is used as the binder for the negative electrode active material layer, regardless of the thickness of the negative electrode active material layer, in cases where the ratio A/B is from about 2.0 to about 3.8 (2.0≤(A/B)≤3.8), the resistance rise ratio (%) after charge-discharge cycling tends to be kept low. By contrast, as shown with Sample C, when the binder in the negative electrode active material layer is PVDF, even if the ratio A/B is from about 2.0 to about 3.8 (2.0≤(A/B)≤3.8), a tendency for the resistance rise ratio (%) after charge-discharge cycling to be kept low is not apparent.

As noted above, a vehicle drive battery repeatedly undergoes high-rate charging and discharging, making it necessary for the negative electrode active material layer to instantaneously intercalate and deintercalate a large amount of lithium ions. In particular, because lithium ion reactions decrease in low-temperature environments of −15° C. and below, it is desired that high-rate charging and discharging be carried out smoothly in such a low-temperature environment. For this reason, it is desirable to use SBR as the binder in the negative electrode active material layer and, moreover to disproportionally distribute the SBR in the surface vicinity A of the negative electrode active material layer so that the above ratio A/B becomes from about 2.0 to about 3.8 (2.0≤(A/B)≤3.8).

An example in which SBR was used as the binder has been described here, although a similar tendency is observable also for other rubber-based binders. According to the findings by the inventors, a similar tendency is observable not only for rubber-based binders, but also in cases where use is made of a resin having a binder function, such as an acrylic binder (e.g., polyethylene oxide (PEO) or polyethylene (PE)) or an imide binder. In addition, it is preferable for such rubber-based binders or resins having a binder resin to be binders which are capable of dispersing in aqueous solvents. With the use of a binder capable of dispersing in an aqueous solvent, in cases where the ratio A/B falls within a specific range (about 2.0 to about 3.8 (2.0≤(A/B)≤3.8), a tendency for the resistance rise ratio (%) after charge-discharge cycling to be kept low is observable.

Here, in the negative electrode active material layer-forming step, by having the proportion of solvent in the negative electrode mixture be large and setting the drying temperature high, conditions were created for easier migration than in the practice to date. As a result, the above ratio A/B increased to more than 2.0 and the binder is disproportionally present in the surface vicinity of the negative electrode active material layer. In cases where migration has been strongly encouraged and the level of rubber-based binder and resin having a binder function in the surface vicinity A1 of the negative electrode active material layer 243A has been set to from about 2 times to about 3.8 times that level in other portions of the negative electrode active material layer 243A, the level of rubber-based binder and resin having a binder function decreases at the boundary between the negative electrode active material layer 243A and the negative electrode current collector 241A. For this reason, there appears to be an increased possibility of the negative electrode active material layer 243A peeling from the negative electrode current collector 241A.

As described above, the lithium ion secondary battery 100A (see FIG. 10) uses a rubber-based binder or a resin having a binder function as the binder in the negative electrode active material layer 243A, and the ratio A/B is 2.0≤(A/B)≤3.8. In such a case, it is desirable that the negative electrode active material layer 243A is not readily peeled from the negative electrode current collector 241A.

Figure 12:
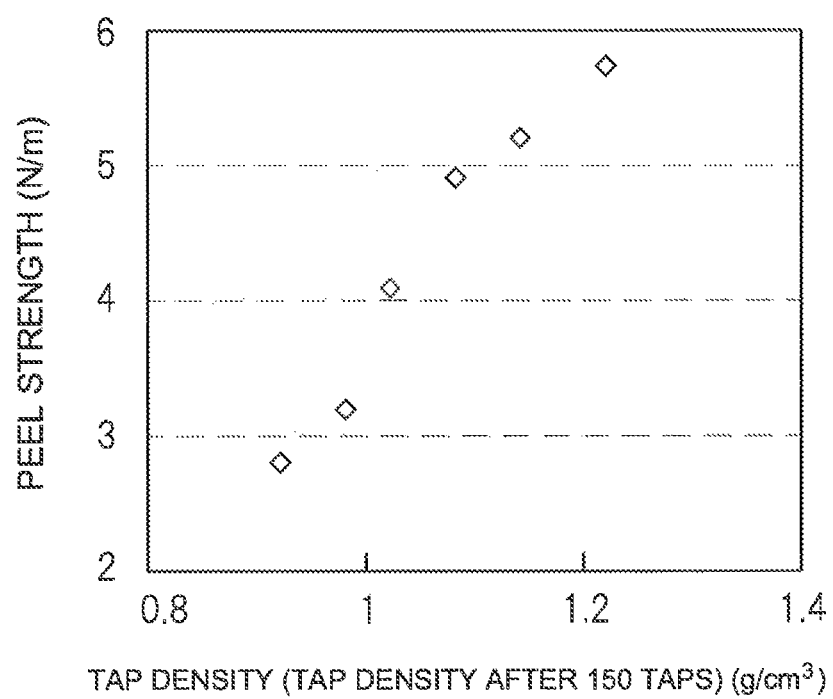
FIG. 12 is a graph showing the relationship between the tap density after 150 taps of the negative electrode active material particles and the peel strength.

Concerning the negative electrode active material particles 710 desirable for use in the negative electrode active material layer 243A, the inventors have proposed that the negative electrode active material particles 710 have a tap density after 150 taps of at least 1 g/cm$^3$. FIG. 12 shows the relationship between the tap density after 150 taps and the peel strength for the negative electrode active material particles 710.

Figure 13:
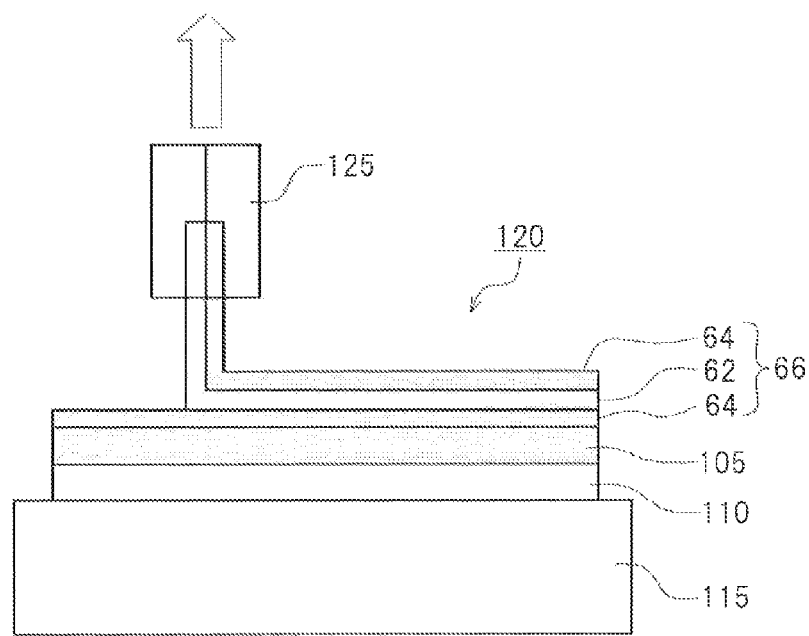
FIG. 13 is a diagram illustrating the 90° peel-type adhesive strength test method.

Here, the tap density after 150 taps is obtained by placing negative electrode active material particles in a measuring cylinder, then mechanically tapping the measuring cylinder with a tapping device 150 times so as shrink the apparent volume of the negative electrode active material particles. The peel strength was measured as shown in FIG. 13 in accordance with the 90° peel-type adhesive strength test method (JIS K 6854-1). FIG. 13 is a diagram showing the 90° peel-type adhesive strength test method.

Here, a specimen 120 was prepared by attaching a pressure-sensitive adhesive tape 105 (No. 3303N, from Nitto Denko Corporation) to the negative electrode active material layer 64 on one side of a negative electrode sheet 66, and was cut out to a size of 15 mm (W)×120 mm (L). In the specimen 120 that had been cut out, the adhesive tape 105 was peeled off over a length of 40 mm from one end. Next, double-sided tape (No. 501F, from Nitto Denko Corporation) was attached to a stage 115. Placing the pressure-sensitive adhesive tape 105 face down on this double-sided tape 110, the above specimen 120 was attached thereto. Next, the peeled 40 mm portion of the specimen 120 was secured to a chuck 125. The chuck 125 was then pulled at an angle of 90° to the stage 115, and the tensile load when the negative electrode active material layer 64 was peeled off the negative electrode current collector 62 was measured. A universal testing machine manufactured by Minebea Co., Ltd. was used for pulling the chuck 125. This was carried out at a pulling rate of 20 m/min. The peel strength N/m was determined by dividing the tensile load (N) obtained by the width (15 mm) of the specimen 120.

According to the findings of the inventors, in the negative electrode active material layer 243A shown in FIG. 10, when the negative electrode active material particles 710 have a tap density after 150 taps of at least about 1 g/cm$^3$, the peel strength becomes high. Hence, in cases where a negative electrode active material layer 243A having binder disproportionally distributed in the surface vicinity A1 is formed, it is desirable to use negative electrode active material particles 710 having a tap density after 150 taps of preferably at least about 1 g/cm$^3$, more preferably at least 1.08 g/cm$^3$, and even more preferably at least 1.10 g/cm$^3$. A suitable peel strength can be thus ensured in the negative electrode active material layer 243A.

In a nonaqueous secondary battery like that described above having a negative electrode sheet 240A in which a negative electrode active material layer 243A is held by a negative electrode current collector 241A, as shown in FIG. 10, a rubber-based binder or a resin having a binder function (e.g., an acrylic binder or an imide binder) may be included in the binder 730 within the negative electrode active material layer 243A. In this case, it is desirable for the rubber-based binder or the resin having a binder function to be abundantly present (disproportionately distributed), within the negative electrode active material layer 243A, in the surface vicinity A1 of the negative electrode active material layer 243A.

In such a nonaqueous secondary battery, a rubber-based binder or a resin having a binder function is abundantly included in the surface vicinity A1 of the negative electrode active material layer 243A. With such a rubber-based binder or a resin having a binder function, the reaction rate during deintercalation or intercalation, within the negative electrode active material layer 243A, of the chemical species that becomes the charge carrier in the secondary battery (e.g., lithium ions in a lithium ion secondary battery) can be kept high. As a result, it is possible, in a low-temperature environment of about −15° C., to hold down the resistance rise ratio after charge-discharge cycling.

In this case, the surface vicinity A1 may be defined as a region accounting for ¼ of the thickness of the negative electrode active material layer 243A from the surface thereof. At this time, it is desirable for the ratio A/B of the combined mass concentration A of the rubber-based binder and the resin having a binder function included in the surface vicinity A1 of the negative electrode active material layer 243A to the combined mass concentration B of the rubber-based binder and the resin having a binder function included in portions other than the surface vicinity A1 of the negative electrode active material layer 243A to satisfy the condition 2.0≤(A/B)≤3.8. This enables the resistance rise ratio after charge-discharge cycling to be held down more reliably in a low-temperature environment at about −15° C. In such a case, the ratio A/B preferably satisfies the condition 2.1≤(A/B), and more preferably satisfies the condition 2.2≤(A/B). Also, the ratio A/B preferably satisfies the condition (A/B)≤3.7, and more preferably satisfies the condition (A/B) ≤3.6. By satisfying these conditions, the resistance rise ratio after charge-discharge cycling can be even more reliably held down.

Also, it is desirable for the rubber-based binder or the resin having a binder function included in the binder to be a binder capable of dispersing in an aqueous solvent. In this case, it is desirable for the rubber-based binder to be SBR, for example. The resin having a binder function includes acrylic binders. The acrylic binder preferably includes at least one binder selected from among polyethylene oxide and polyethylene.

In this case, it is desirable for the negative electrode active material particles to have a tap density after 150 taps of at least 1 g/cm$^3$. This enables the peel strength of the negative electrode active material layer 243A to be enhanced. By disproportionately distributing the binder 730 at the surface vicinity A1 of the negative electrode active material layer 243A, a decrease in the peel strength of the negative electrode active material layer 243A can be suppressed.

This nonaqueous secondary battery may be constructed as a lithium ion battery. Moreover, this invention is not limited to one of the above-described embodiments. For example, although the nonaqueous secondary battery was exemplified by lithium ion secondary batteries in the above-described embodiments, this invention may be applied to nonaqueous secondary batteries other than lithium ion secondary batteries. A plurality of the nonaqueous secondary battery may together make up a battery pack. Also, in the nonaqueous secondary battery of the invention, the resistance rise ratio after charge-discharge cycling can, especially in a low-temperature environment at about −15° C., be held low. Hence, the foregoing nonaqueous secondary battery and battery pack are especially preferred for constructing vehicle drive batteries which are required to suppress a rise in resistance in such low-temperature environments.

Nonaqueous secondary batteries according to embodiments of this invention have been described above, although the nonaqueous secondary battery of the invention is not limited to the above-described embodiments, various modifications thereto being possible.

Figure 14:
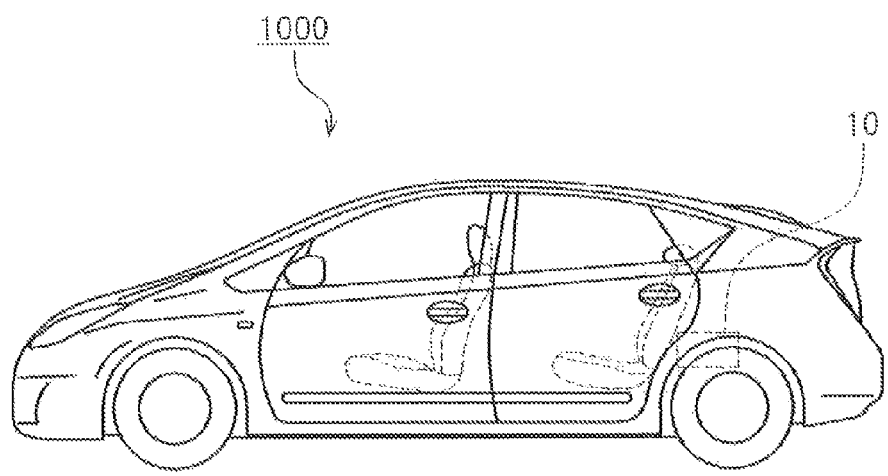
FIG. 14 is a schematic side view of a vehicle (automobile) equipped with a nonaqueous secondary battery (vehicle drive battery) according to an embodiment of the invention.

The nonaqueous secondary battery disclosed herein is able to hold down the resistance rise ratio in low-temperature environments in particular, enabling nonaqueous secondary batteries such as lithium ion secondary batteries that exhibit a high performance in low-temperature environments to be provided. Therefore, as shown in FIG. 14, this invention enables a vehicle 1000 (typically an automobile, and especially an automobile having an electric motor, such as a hybrid car or an electric car) equipped with this nonaqueous secondary battery 10 (which may be in the form of a battery pack formed by connecting a plurality of such nonaqueous secondary batteries 10 in series) as the power source (vehicle drive battery) to be provided.

REFERENCE SIGNS LIST

10 Vehicle drive battery
100, 100A Lithium ion secondary battery (nonaqueous secondary battery)
200 Coiled electrode assembly
220 Positive electrode sheet
221 Positive electrode current collector
222 Uncoated region
223 Positive electrode active material layer
224 Middle portion
225 Gap
240, 240A Negative electrode sheet
241, 241A Negative electrode current collector
242, 242A Uncoated region
243, 243A Negative electrode active material layer
262, 264 Separator
280 Electrolyte
290 Charger
300 Battery case
320 Container body
340 Lid
350 Electrolyte injection hole
352 Sealing cap
360 Safety valve
420 Electrode terminal
440 Electrode terminal
610 Positive electrode active material particle
620 Conductive material
630 Binder
710 Negative electrode active material particles
730 Binder
1000 Vehicle

The invention claimed is:

1. A nonaqueous secondary battery, comprising:
a negative electrode current collector, and
a negative electrode active material layer, formed of a single layer, held by the negative electrode current collector, the negative electrode active material layer comprising:
a first region that accounts for ¼ of the thickness of the negative electrode active material layer from a surface opposing to the negative electrode current collector, and
a second region that accounts for the remaining ¾ of the thickness of the negative electrode active material layer;
both of the first region and the second region including negative electrode active material particles and a binder,
the binder containing a rubber-based binder and/or a resin having a binder function, wherein
at least part of the binder migrates from the second region to the first region,
the first region contains more binder than in the second region, and
the binder included in the first region has a mass concentration A and the binder included in the second region has a mass concentration B such that the ratio A/B satisfies the condition 2.0<(A/B)<3.8.

2. The nonaqueous secondary battery according to claim 1, wherein the binder included in the first region and the second region is dispersible in an aqueous solvent.

3. The nonaqueous secondary battery according to claim 1, including styrene-butadiene rubber (SBR) as the rubber-based binder.

4. The nonaqueous secondary battery according to claim 1, including at least one binder selected from the group consisting of polyethylene oxide, polyethylene, an acrylic binder, and an imide binder as the resin having a binder function.

5. The nonaqueous secondary battery according to claim 1, wherein the negative electrode active material layer is made by using the negative electrode active material particles having a tap density after 150 taps of at least 1 g/cm$^3$.

6. The nonaqueous secondary battery according to claim 1, which is constructed as a lithium ion battery.

7. A battery pack obtained by combining a plurality of the nonaqueous secondary batteries according to claim 1.

8. A vehicle drive battery comprising the nonaqueous secondary battery according to claim 1 or a battery pack obtained by combining a plurality of the nonaqueous secondary batteries according to claim 1.

9. The nonaqueous secondary battery according to claim 1, wherein
the negative electrode active material layer is formed by coating the negative electrode current collector with a negative electrode mixture in which the negative electrode active material particles and the binder are dispersed in an aqueous solvent.

* * * * *